Dec. 9, 1952 G. H. MADDOX 2,621,274
TIRE PRESSURE INDICATOR
Filed July 10, 1950 2 SHEETS—SHEET 1
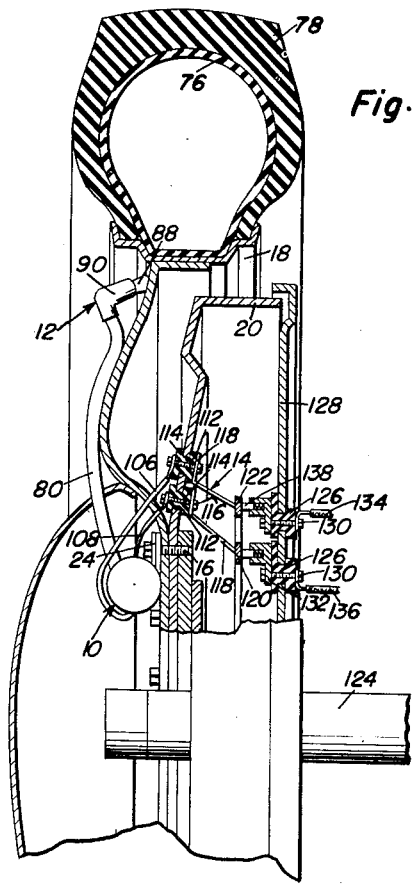
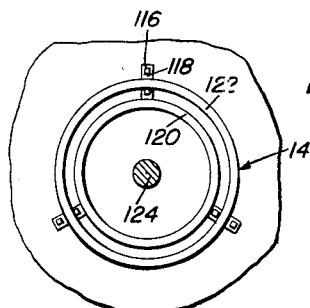
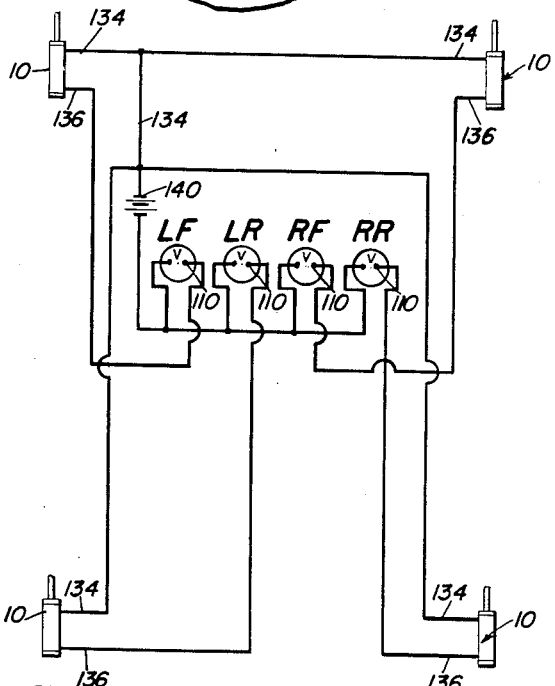
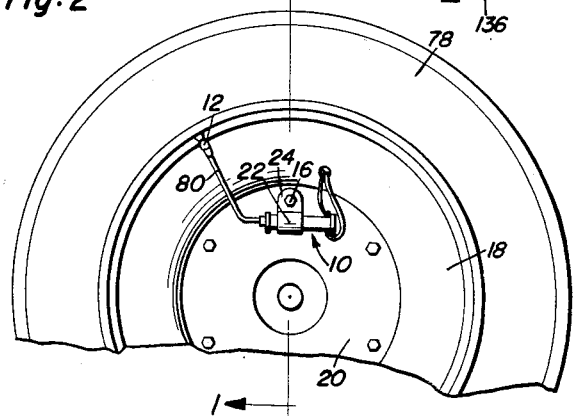
Fig. 1
Fig. 3
Fig. 2
Fig. 9
Gerald H. Maddox
INVENTOR.
BY *Clarence A. O'Brien*
*and Harvey B. Jacobson*
Attorneys Dec. 9, 1952  G. H. MADDOX  2,621,274
TIRE PRESSURE INDICATOR
Filed July 10, 1950  2 SHEETS—SHEET 2
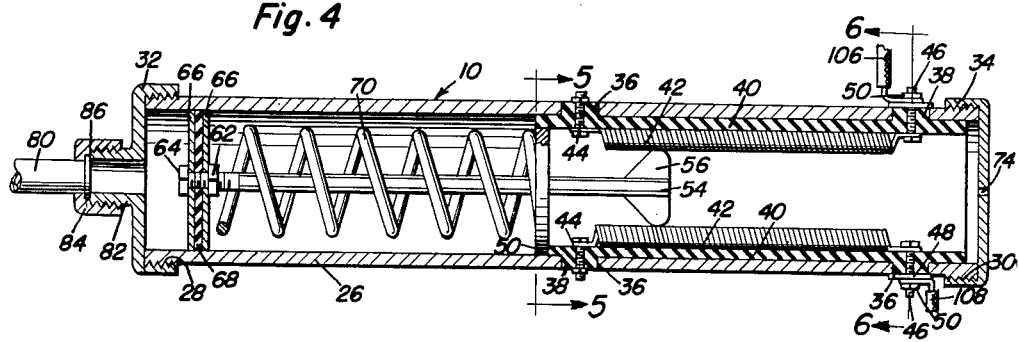
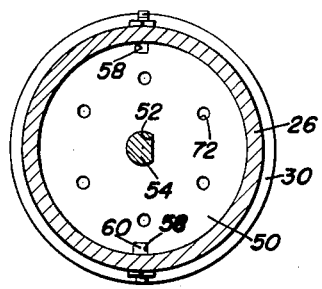
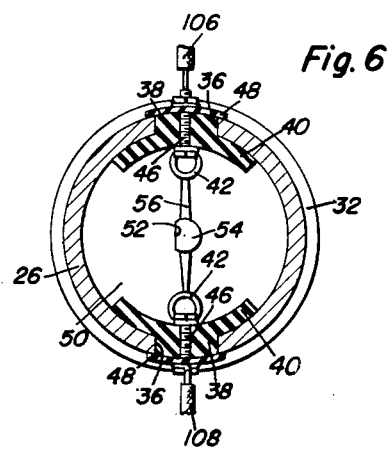
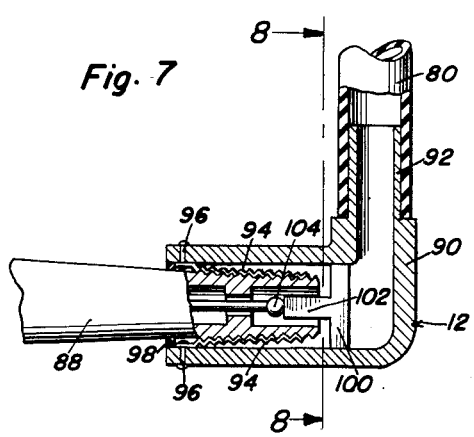
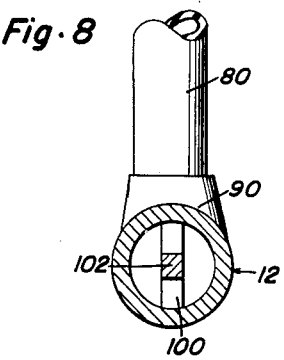
Gerald H. Maddox
INVENTOR.
BY Clarence A. O'Brien
and Harvey B. Jacobson
Attorneys Patented Dec. 9, 1952

2,621,274

UNITED STATES PATENT OFFICE 2,621,274

TIRE PRESSURE INDICATOR

Gerald H. Maddox, Lincoln, Nebr.

Application July 10, 1950, Serial No. 172,800

6 Claims. (Cl. 201—48)

This invention comprises novel and useful improvements in air pressure gauges, and more particularly pertains to a gauge for indicating the air pressure in a tire at a point remote therefrom, independently of whether the vehicle is or is not in motion.

An important object of this invention is to provide a tire pressure indicator for vehicles, which will measure the air pressure in the tires independently of whether the vehicle wheels are or are not in motion.

Another important object of this invention is to provide a tire pressure indicator, in accordance with the foregoing objects, which indicator will minimize the inbalance of the wheels, caused by the utilization of the air pressure indicator.

A further object of this invention is to provide a tire pressure indicator, in accordance with the foregoing objects, which indicator will not be operatively affected by the centrifugal force, which acts upon the various component parts, as the vehicle wheels rotate.

Yet another object of this invention is to provide a tire pressure indicator, in accordance with the foregoing objects, which indicator is of simple construction, which can be readily manufactured and assembled, and which is durable, and highly efficient for the purposes intended.

An important feature of this invention resides in the provision of a tire pressure indicator which includes a gauge tube, with means for mounting the gauge tube on one of the bolts which secure the vehicle wheel to the vehicle brake drum.

Another feature of this invention resides in the provision of a tire pressure indicator, in accordance with the foregoing features, together with a conduit communicating with the gauge tube, and a valve stem engaging ends of the conduit, with an improved means in the valve head for detachably securing the same to the valve stem.

These, together with various ancillary objects and features, are attained by this device, the preferred embodiment of which has been illustrated by way of example only in the accompanying drawings, wherein:

Figure 1 is a fragmentary transverse sectional view of a vehicle wheel with the tire pressure indicator shown mounted thereon;

Figure 2 is a fragmentary side elevational view of a vehicle wheel, with the tire pressure indicator shown mounted thereon;

Figure 3 is a fragmentary rear elevational view of the brake drum of the vehicle wheel, showing the slip ring construction mounted upon the brake drum;

Figure 4 is a longitudinal sectional view of the gauge tube;

Figure 5 is a transverse sectional view of the gauge tube, taken substantially on the plane 5—5 of Figure 4;

Figure 6 is a transverse sectional view of the gauge tube taken substantially on the plane 6—6 of Figure 4;

Figure 7 is a fragmentary longitudinal sectional view of the valve stem engaging head;

Figure 8 is a transverse sectional view of the valve stem engaging head, taken substantially on the plane 8—8 of Figure 7;

Figure 9 is a schematic wiring diagram showing the manner in which the electrically responsive indicators are connected to the variable rheostat in the gauge tube.

Referring now more specifically to the accompanying drawings wherein like numerals designate similar parts throughout the various views, it will be seen that there is provided a tire pressure indicator device consisting generally of a gauge tube 10, a valve stem engaging head 12, and a slip ring construction 14 for electrically connecting the gauge tube which is mounted upon the rotating portion of the wheel, to the stationary frame.

As will be readily seen from a consideration of Figures 1 and 2, the gauge tube 10 is adapted to be mounted upon one of the stud bolts 16 which generally secure the wheel disc 18 to the brake drum 20, and for this purpose there is provided a tube embracing band 22, which encircles the gauge tube, the band having overlapping edge portions 24 which underlie the head of the stud bolt 16. Since, as will clearly become apparent as the following description proceeds, the relatively moving parts within the gauge tube move longitudinally thereof, it is intended that the gauge tube be mounted so that its longitudinal axis will extend perpendicular to the radius of the wheel 18.

The gauge tube 10 consists generally of an electrical casing 26 which has externally threaded end portions 28 and 30, which end portions respectively receive a correspondingly internally threaded nipple cap 32 and end cap 34. The electrical casing 26 is also provided with longitudinally spaced transverse bores 36, each of which receives a corresponding ear 38 which is formed integrally with the arcuate longitudinally extending insulating strips 40. A pair of electrical resistance elements 42 are secured to each of the strips 40, by means of fasteners 44 and 46 which extend through the strip 40 and the ears 38. It is intended that a pair of the fasteners, such as 46, which extend through the casing 26, and are electrically insulated therefrom, as by the ears 38, also serve as contact members by means of which the resistance elements are electrically connected to suitable electrically responsive indicators. In order to lock the insulating strips 40 to the casing 26, it is apparent that there may be provided electrically insulated washers 48 which overlie the bores 36 in the casing, and which, by means of the fasteners 46 and nuts 50 lock the insulating strips 40 and casing 26 together.

Disposed within the casing 26, intermediate the ends thereof, is a plate 50, which preferably abuts against the ends of the insulating strips 40, and which disc has a preferably non-circular bore 52 therein. A complementary rod 54 is slidably, but non-rotatably received within the bore 52, which rod carries a contact bar 56, this bar being insulated from the casing, in any desired manner. For this purpose, the rod 54 itself may be of electrically insulated material, or an insulating strip may be interposed between the contact bar 56 and the rod 54, as desired. The contact bar 56, as best shown in Figures 4 and 5, slidably contacts the resistance element 42, thereby selectively "shorting" the resistance elements 42, to each other, at predetermined longitudinally spaced points. It will thus be apparent that it is undesirable to have relative angular movements between the contact bar 56, and the corresponding resistance elements 42, and it is therefore intended that the plate 50 be non-rotatably mounted within the casing. For this purpose the plate may be provided with circumferentially spaced recesses 58 which may receive a corresponding key 60 formed integrally with the end of the insulating strips 40. A piston assembly, is attached in the other end of the rod, as by the nuts 62 and 64, which piston assembly, as is readily apparent from a consideration of Figure 4, is longitudinally adjustable relative to the rod 54, by merely suitably adjusting the nut 62 on the rod, and locking the piston assembly thereto, by means of the nut 64. The piston assembly may conveniently consist of a pair of discs 66, of metal or the like, between which is interposed a fibrous layer 68 of leather or the like so as to provide a slidable, veneer type strip between the discs of the piston assembly. A spring member 70 is disposed between the plate 50 and one of the discs 66 of the piston assembly, and yieldingly urges the piston assembly in a direction in opposition to the air pressure which communicates with the face of the piston assembly.

In order to eliminate the dash pot effect within the casing 26, the plate 50 at the end cap 34 are respectively provided with bores 72 and 74 through which the air between the piston assembly and the plate and end cap may readily escape as the position of the piston assembly in the casing is varied.

The air pressure, within the tube 76 of the tire 78, is communicated with the casing 26, by means of a conduit 80 which is attached to the nipple 82 of the cap 32, by means of a coupling member 84 and sealed by a suitable packing gland 86.

The head 12, which is adapted to be detachably mounted upon the stem 88 of the tube 76 consists generally of an L-shaped body member 90 one leg of which has a reduced neck portion 92, which receives the conduit 80, the other leg of which is provided with a pair of inwardly extending, and relatively converging strips 94, which are preferably corrugated, as best shown in Figure 7 of the drawings, so as to firmly grip the end of the valve stem 88, the strips 94 being secured to the body 90, by suitable fasteners 96, adjacent their outer ends. A suitable air tight gland 98 is disposed on the end of the body member, so that it encircles the valve stem 88, in air tight and sealing engagement therewith.

A cross member 100 having an outwardly extending leg 102 is mounted within the body 90, so as to depress the valve core 104 when the head 12 is positioned on the valve stem 88. In this manner, it will be seen that the casing 26 is in communication with the air pressure within the tube 76, when the valve stem engaging head 12 is mounted upon the valve stem 88, and as soon as the head 12 is removed from the stem, the valve core 104 is also relieved, thereby preventing the escape of air.

The slip ring assembly 14, previously discussed, is provided in order to electrically connect the conductors 106 and 108 of the rotating drum 20, to suitably electrically responsive indicators 110 which are mounted, as upon the dash board of the vehicle, in clear sight of the driver. The electrically responsive indicators 110, are of known construction, it being intended that the same are responsive to variations in the flow of current, and accordingly further discussion and description thereof is believed to be unnecessary.

The slip ring assembly 14 includes a plurality of radially disposed bores 112 in the brake drum 20, which bores receive a flanged insulating block 114. Common fastening bolts 116 extend through each of the blocks 114, and electrically contact and secure each of the wires 106 and 108 to a corresponding slip ring support bracket 118. An inner and outer slip ring 120 and 122 respectively are secured to the corresponding sets of support brackets 118, as by welding or the like, preferably axially of the wheel shaft 124.

A second set of insulating blocks 126 are mounted within suitable bores in the backing plate 128 of the brake drum 20, and suitable fastening bolts 130 extend through the blocks 126, and serve to mount, at opposite sides of the blocks, respectively, brush mounting brackets 132 and electrical conductors 134 and 136. Suitable electrical contact brushes 138 are mounted within the bracket 132, and spring urged into engagement with the respective slip rings 120 and 122.

The resistance elements 42, in each of the tire pressure indicating devices 10, are electrically connected, by the conductors 134 and 136, in series with the electrically responsive indicator 110, to a suitable source of power 140, which may comprise the battery of the car or the like.

In operation, the valve stem engaging head 12 is mounted upon the valve stem 88, the forwardly extending arm 102 depressing the valve core 104, whereby the conduit 80 and the casing 26 are in communication with the air pressure within the tire tube 76. This air pressure will move the disc assembly, in opposition to the spring 70, away from the nippled cap 32, in proportion to the air pressure within the tire tube. The contact bar 56 will thus be urged longitudinally of the casing 26, thereby selectively reducing the effective resistance of the element 42, whereby the flow of current through the electrically responsive indicators 110 is increased. Obviously, the indicators 110 may be suitably calibrated so that a given change in the air pressure will cause a corresponding variation in the reading of the electrically responsive indicators 110.

From the foregoing, it is felt that the operation and construction of the device will be readily understood, and further discussion is therefore believed to be unnecessary. However, since numerous modifications will readily occur to those skilled in the art after a consideration of the foregoing specification and accompanying drawing, it is not intended to limit the invention to that shown and described, but all suitable modifications may be resorted to falling within the scope of the appended claims.

Having described the invention, what is claimed as new is:

1. In an air pressure indicator for tires, a pressure responsive rheostat comprising a gauge tube, electrical insulating strips disposed within one end of said tube, a pair of electrical resistance elements mounted on said strips and a pair of contact terminals connected to one end of each of said elements and extending through said tube, a plate disposed within said tube and abutting the ends of said insulating strips, a rod extending through said plate, a movable wall secured to one end of said rod, a contact arm on the other end of said rod slidably engaging said resistance elements to vary the effective resistance thereof, said movable wall being responsive to the pressure in a tire.

2. The combination of claim 1 including a spring disposed between said movable wall and said plate, means non-rotatably mounting said plate in said tube, means slidably and non-rotatably mounting said rod in said plate.

3. The combination of claim 1 including a key extending from each of said insulating strips, said plate having circumferentially spaced recesses therein receiving said keys, splines on said rod, said plate having a bore therein slidably and non-rotatably receiving said rod.

4. A pressure responsive rheostat comprising a tube having a pair of transverse bores extending therethrough, a pair of electrically insulating strips disposed in one end of said tube, ears on each of said strips extending through said bores, electrical resistance elements disposed on said strip, means for fastening said elements and said strips to said tube, said fastening means extending through said ears to provide contact terminals for said resistance elements, a plate disposed in said tube and abutting said insulating strips, means carried by said insulating strips for preventing rotation of said plate relative to said strips, said plate having a non-circular bore therethrough, a rod slidably and non-rotatably received in said bore, a contact bar carried by said rod and engaging said resistance elements, and a movable wall on the other end of said rod.

5. The combination of claim 4 including a spring disposed between said plate and said movable wall.

6. In an air pressure indicator for tires, a pressure responsive rheostat comprising a gauge tube, electrical insulating strips disposed within one end of said tube, a pair of electrical resistance elements mounted on said strips and a pair of contact terminals connected to one end of each of said elements and extending through said tube, a plate disposed within said tube and abutting the ends of said insulating strips, a key extending from each of said insulating strips, said plate having circumferentially spaced recesses therein receiving said keys, a rod extending through said plate, said plate having a bore therein slidably and non-rotatably receiving said rod, a movable wall secured to one end of said rod, a spring disposed between said movable wall and said plate, a contact arm on the other end of said rod slidably engaging said resistance elements to vary the effective resistance thereof.

GERALD H. MADDOX.

REFERENCES CITED

The following references are of record in the file of this patent:

UNITED STATES PATENTS

| Number | Name | Date |
|---|---|---|
| 664,341 | Trommlitz et al. | Dec. 18, 1900 |
| 995,893 | Neitzel | June 20, 1911 |
| 1,120,228 | Newton | Dec. 8, 1914 |
| 1,345,520 | Vivarttas | July 6, 1920 |
| 1,385,080 | Key | July 19, 1921 |
| 1,811,769 | Weaver | June 23, 1931 |
| 1,928,732 | Muir | Oct. 3, 1933 |
| 2,127,429 | Schoepf et al. | Aug. 16, 1939 |
| 2,178,422 | Heagney | Oct. 31, 1939 |
| 2,423,609 | Middleton et al. | July 8, 1947 |
| 2,443,252 | Kelly | June 15, 1948 |
| 2,526,124 | Dobson et al. | Oct. 17, 1950 |